(12) United States Patent
Handley et al.

(10) Patent No.: US 10,790,488 B2
(45) Date of Patent: Sep. 29, 2020

(54) BATTERY ENCLOSURE WITH PROTECTIVE FIN

(71) Applicant: Ford Global Technologies, LLC, Dearborn, MI (US)

(72) Inventors: Christian Johan Owen Handley, Madison Heights, MI (US); Saravanan Paramasivam, South Lyon, MI (US); Asif Iqbal, Macomb, MI (US); Jeffery Christ, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 15/920,587

(22) Filed: Mar. 14, 2018

(65) Prior Publication Data

US 2019/0140228 A1 May 9, 2019

Related U.S. Application Data

(60) Provisional application No. 62/582,555, filed on Nov. 7, 2017.

(51) Int. Cl.
*H01M 2/10* (2006.01)
*H01M 10/613* (2014.01)
*H01M 10/6556* (2014.01)
*H01M 10/625* (2014.01)

(52) U.S. Cl.
CPC ....... *H01M 2/1077* (2013.01); *H01M 2/1083* (2013.01); *H01M 10/613* (2015.04); *H01M 10/625* (2015.04); *H01M 10/6556* (2015.04); *H01M 2220/20* (2013.01)

(58) Field of Classification Search
None
See application file for complete search history.

(56) References Cited

U.S. PATENT DOCUMENTS

| 4,917,684 | A | 4/1990 | Yasumura |
| 7,336,487 | B1 | 2/2008 | Chrysler et al. |
| 8,333,707 | B2 | 12/2012 | Parnagian |
| 2008/0220323 | A1 | 9/2008 | Corless et al. |
| 2014/0272508 | A1 | 9/2014 | Musetti |
| 2015/0144314 | A1 | 5/2015 | Srinivassan et al. |
| 2017/0001507 | A1 | 1/2017 | Ashraf et al. |
| 2017/0025651 | A1 | 1/2017 | Baek et al. |
| 2017/0025721 | A1 | 1/2017 | Moschet et al. |
| 2017/0288185 | A1 | 10/2017 | Maguire |

FOREIGN PATENT DOCUMENTS

KR 101611563 4/2016

*Primary Examiner* — Sarah A. Slifka
(74) *Attorney, Agent, or Firm* — David Kelley, Esq.; Carlson, Gaskey & Olds, P.C.

(57) ABSTRACT

An exemplary battery assembly according includes, among other things, a tray, and a cover adjacent the tray to provide a flow path therebetween. The battery assembly further includes a tray boss configured to selectively provide a port through the tray to the flow path, a cover boss configured to selectively provide a port through the cover to the flow path, and a protective fin that is spaced from, and extends at least partially about, the tray boss or the cover boss. An exemplary battery coolant port protection method includes, among other things, forming a cover or a tray with both a boss and a protective fin. The method further removing material from the boss to provide a coolant port to a flow path between the cover and the tray.

19 Claims, 3 Drawing Sheets

BATTERY ENCLOSURE WITH PROTECTIVE FIN

CROSS-REFERENCE TO RELATED APPLICATIONS

This application claims priority to U.S. Provisional Application No. 62/582,555, which was filed on 7 Nov. 2017 and is incorporated herein by reference.

TECHNICAL FIELD

This disclosure relates generally to an enclosure for a battery pack of an electrical vehicle and, more particularly, to an enclosure having design flexibility for different vehicle packaging environments.

BACKGROUND

Electrified vehicles generally differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The battery pack typically includes at least one group of battery cells held within an open area provided by the enclosure. A fluid can communicate through portions of the enclosure outside the open area. The fluid can help to manage thermal energy levels, which can improve efficiencies and inhibit undesirable thermal energy buildup. Different electrified vehicles can have different packaging environments for accommodating the battery pack.

SUMMARY

A battery assembly according to an exemplary aspect of the present disclosure includes, among other things, a tray, and a cover adjacent the tray to provide a flow path therebetween. The battery assembly further includes a tray boss configured to selectively provide a port through the tray to the flow path, a cover boss configured to selectively provide a port through the cover to the flow path, and a protective fin that is spaced from, and extends at least partially about, the tray boss or the cover boss.

In a further non-limiting embodiment of the foregoing assembly, the tray boss is a continuous monolithic portion of the tray and the cover boss is continuous monolithic portion of the cover.

In a further non-limiting embodiment of any of the foregoing assemblies, the protective fin extends at least partially about the cover boss, and the protective fin is a continuous monolithic portion of the cover.

A further non-limiting embodiment of any of the foregoing assemblies includes an aperture within the cover boss to provide the port through the cover.

In a further non-limiting embodiment of any of the foregoing assemblies, the cover boss is a first cover boss and the port through the cover provided by the aperture in first cover boss is an inlet to the flow path. The assembly further includes a second cover boss with an aperture that provides an outlet from the flow path.

In a further non-limiting embodiment of any of the foregoing assemblies, the cover boss extends longitudinally a first distance from a surrounding outer surface of the cover, and the protective fin extends longitudinally a second distance from the surrounding outer surface of the cover. The second distance is greater than the first distance.

A further non-limiting embodiment of any of the foregoing assemblies includes a coupling connected directly to the cover boss. The coupling fluidly couples a coolant conduit to the port through the cover provided by the cover boss. The coupling, when directly connected to the cover boss, extends a third distance from the surrounding outer surface of the cover. The second distance is greater than the third distance.

In a further non-limiting embodiment of any of the foregoing assemblies, the protective fin extends about a partial circumferential perimeter of the cover boss, and the protective fin is radially spaced a distance from all portions of the cover boss relative to a longitudinal axis of the protective fin.

In a further non-limiting embodiment of any of the foregoing assemblies, the protective fin and the cover boss project vertically downward from the surrounding outer surface of the cover.

In a further non-limiting embodiment of any of the foregoing assemblies, the tray boss projects laterally from a surrounding outer surface of the tray.

A further non-limiting embodiment of any of the foregoing assemblies includes an aperture within the tray boss to provide the port through the tray. The protective fin extends at least partially about the cover boss and is configured to be removed from the remaining portions of the cover.

A battery coolant port protection method according to another exemplary aspect of the present disclosure includes, among other things, forming a cover or a tray with both a boss and a protective fin. The method further includes removing material from the boss to provide a coolant port to a flow path between the cover and tray.

In a further non-limiting embodiment of the foregoing method, the removing comprises drilling an aperture within the boss.

A further non-limiting embodiment of any of the foregoing methods includes forming the protective structure as a continuous monolithic portion of the cover.

In a further non-limiting embodiment of any of the foregoing methods, the protective fin is configured to extend vertically downward when in the battery pack is in an installed position within the electrified vehicle.

A further non-limiting embodiment of any of the foregoing methods includes forming the protective structure as a continuous monolithic portion of the tray.

In a further non-limiting embodiment of any of the foregoing methods, the protective fin and the boss are formed with the cover, and the protective fin is configured to extend from a surrounding surface of the cover vertically downward further than the boss when the battery pack is installed within the electrified vehicle.

A further non-limiting embodiment of any of the foregoing methods includes engaging the boss with a coupling. The protective fin further configured to extend from the surrounding surface of the cover vertically downward further than the coupling when the battery pack is installed within the electrified vehicle.

In a further non-limiting embodiment of any of the foregoing methods, the protective fin extends about a partial circumferential perimeter of the boss, and the protective fin is radially spaced a distance from all portions of the boss relative to a longitudinal axis of the protective fin.

A further non-limiting embodiment of any of the foregoing methods includes moving a fluid through the port to the flow path. The fluid is circulated along the flow path to manage thermal energy levels within the battery pack.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to an enclosure for a battery pack of an electrified vehicle. The enclosure includes a flow path for a fluid. The enclosure can be adapted to provide inlet and outlet ports to the flow path in various locations.

Figure 1:
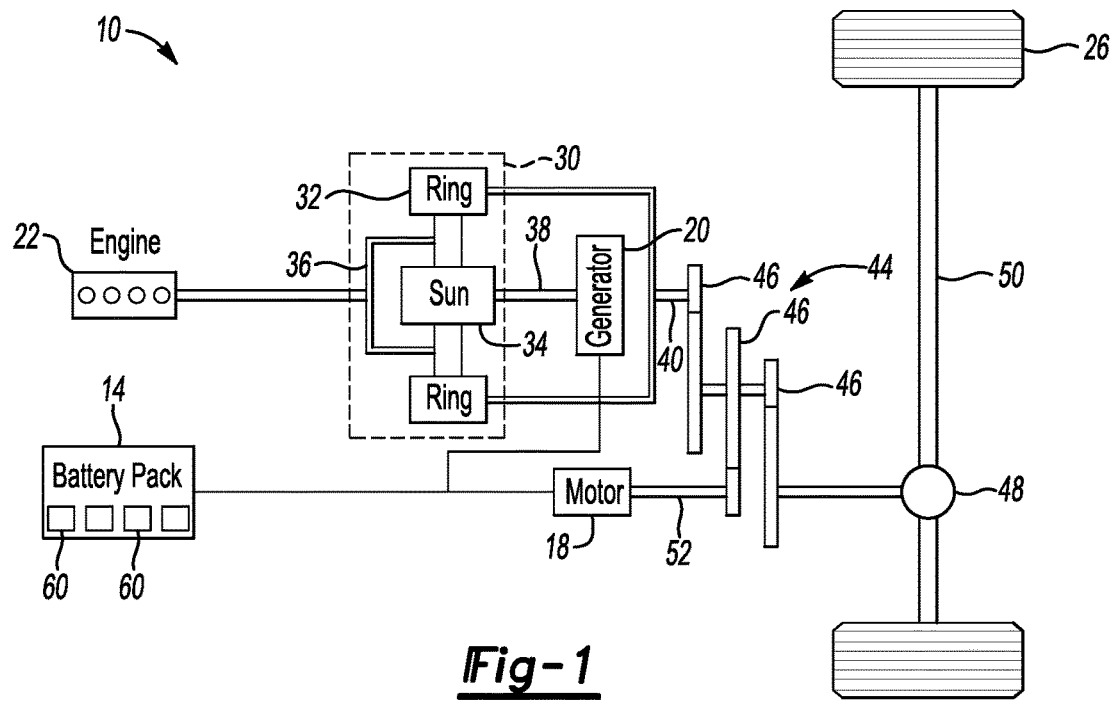
FIG. 1 illustrates a schematic view of a powertrain of an electrified vehicle.

FIG. 1 schematically illustrates a powertrain 10 for an electrified vehicle, which is a hybrid electric vehicle (HEV) in this example. Although depicted as an HEV, it should be understood that the concepts described herein are not limited to HEVs and could extend to other types of electrified vehicle, including, but not limited to, plug-in hybrid electric vehicles (PHEVs), battery electric vehicles (BEVs), fuel cell vehicles, etc.

The powertrain 10 includes a battery pack 14, a motor 18, a generator 20, and an internal combustion engine 22. The motor 18 and generator 20 are types of electric machines. The motor 18 and generator 20 may be separate or may have the form of a combined motor-generator.

In this embodiment, the powertrain 10 is a power-split powertrain system that employs a first drive system and a second drive system. The first and second drive systems generate torque to drive one or more sets of vehicle drive wheels 26 of the electrified vehicle. The first drive system includes a combination of the engine 22 and the generator 20. The second drive system includes at least the motor 18, the generator 20, and the battery pack 14. The motor 18 and the generator 20 are portions of an electric drive system of the powertrain 10.

The engine 22, which is an internal combustion engine in this example, and the generator 20 may be connected through a power transfer unit 30, such as a planetary gear set. Of course, other types of power transfer units, including other gear sets and transmissions, could be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30. Because the generator 20 is operatively connected to the engine 22, the speed of the engine 22 can be controlled by the generator 20.

The ring gear 32 of the power transfer unit 30 can be connected to a shaft 40, which is connected to vehicle drive wheels 26 through a second power transfer unit 44. The second power transfer unit 44 may include a gear set having a plurality of gears 46. Other power transfer units may also be suitable.

The gears 46 transfer torque from the engine 22 to a differential 48 to ultimately provide traction to the vehicle drive wheels 26. The differential 48 may include a plurality of gears that enable the transfer of torque to the vehicle drive wheels 26. In this example, the second power transfer unit 44 is mechanically coupled to an axle 50 through the differential 48 to distribute torque to the vehicle drive wheels 26.

The motor 18 can also be employed to drive the vehicle drive wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery pack 14. The battery pack 14 can include a plurality of battery cells 60 within an enclosure assembly.

Figure 2:
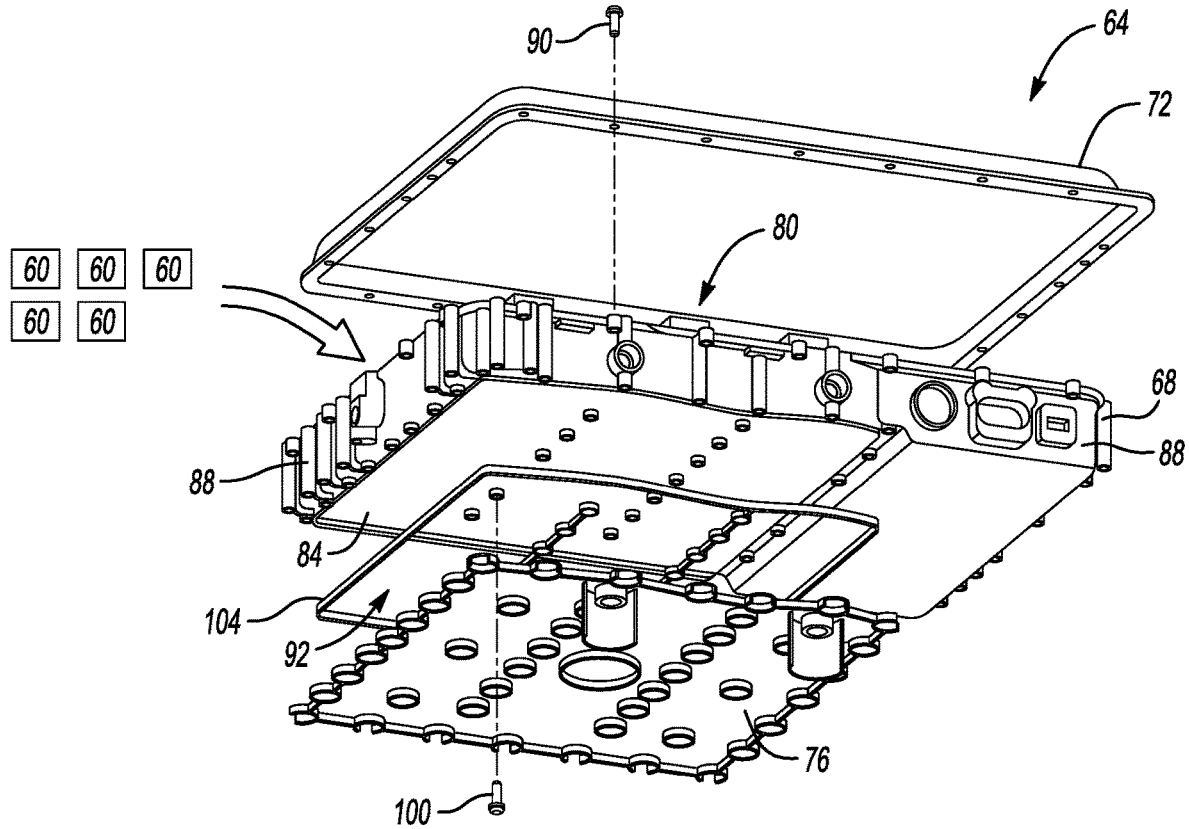
FIG. 2 illustrates an expanded view of selected portions of a battery pack from the powertrain of FIG. 1 according to an exemplary embodiment.

Referring now to FIG. 2, an enclosure assembly 64 suitable for containing the plurality of battery cells 60 from FIG. 1 includes a tray 68, an enclosure lid 72, and a fluid path cover 76. In an exemplary non-limiting embodiment, the tray 68, the lid 72, and the cover 76 are each partially cast from a metal or metal alloy material. In another example, one or more of the tray 68, the lid 72, or the cover 76 is injection molded.

The battery cells 60 can be housed within an open area 80 provided between the tray 68 and the lid 72. When within the open area 80, the battery cells 60 are disposed on a floor 84 of the tray 68. Walls 88 of the tray 68 are disposed about a perimeter of the floor 84 and extend transverse from the floor 84 to the lid 72. Mechanical fasteners 90, for example, can be used to secure the lid 72 to the walls 88 of the tray 68 to enclose the battery cells 60 within the open area 80.

The cover 76, in this exemplary non-limiting embodiment, is disposed adjacent a side of the tray 68 opposite the lid 72. The cover 76 can connect to the tray 68 to provide a flow path 92 that is between the floor 8A of the tray 68 and the covers. The cover 76 can be secured adjacent to the tray 68 utilizing a plurality of mechanical fasteners 100, for example. Seals 104 can be disposed at the interfaces between the cover 76 and the tray 68 to contain fluid within the flow path 92. The example flow path 92 extends along floor 84 on an opposite side from the battery cells 60. Generally, the flow path 92 is separated from the open area 80 by the floor 84 of the tray 68.

Fluid can circulate through the flow path 92 to manage thermal energy levels of the battery cells 60 and other portions of the battery pack 14. The fluid circulated through the flow path 92 can move to the battery pack 14 from a fluid supply, and then circulate through the flow path 92 to take on thermal energy. The fluid can move from the flow path 92 to a heat exchanger, for example, where the fluid releases the thermal energy. The fluid can then move back to the fluid supply. The fluid can be liquid. In a specific example, the fluid is liquid water.

Fluid ports can be utilized to move fluid to and from the flow path 92. Ports located in different areas could be utilized for different vehicle packaging environments. The exemplary embodiment incorporates features enabling the ports to have a plurality of potential locations within the tray 68, the cover 76, or both.

Figure 3:
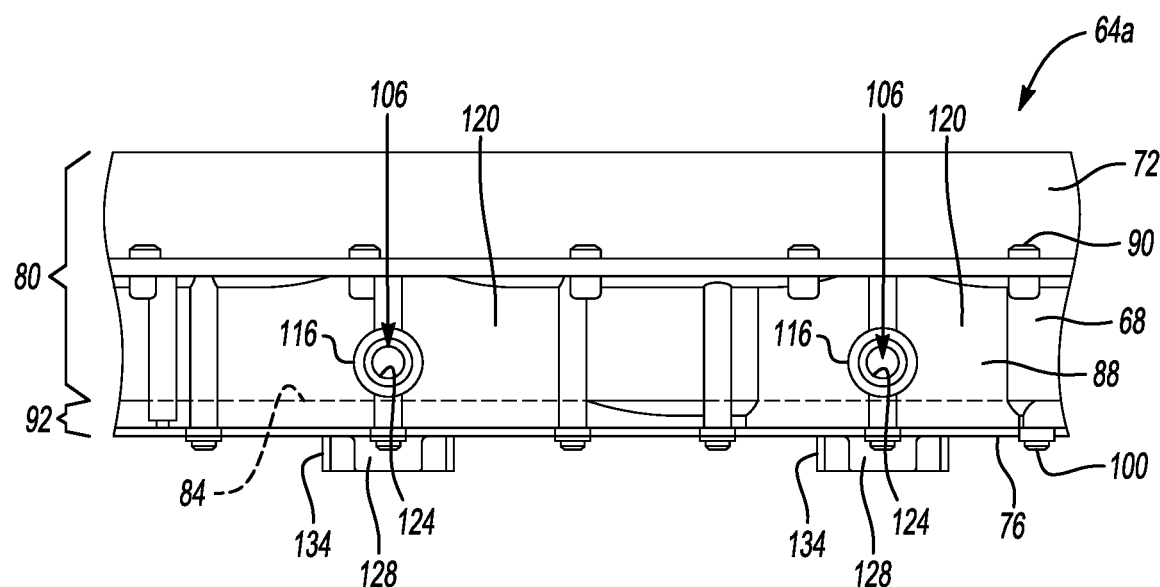
FIG. 3 illustrates a close up side view of the battery pack of FIG. 2 when utilizing ports in a laterally facing side.
Figure 4:
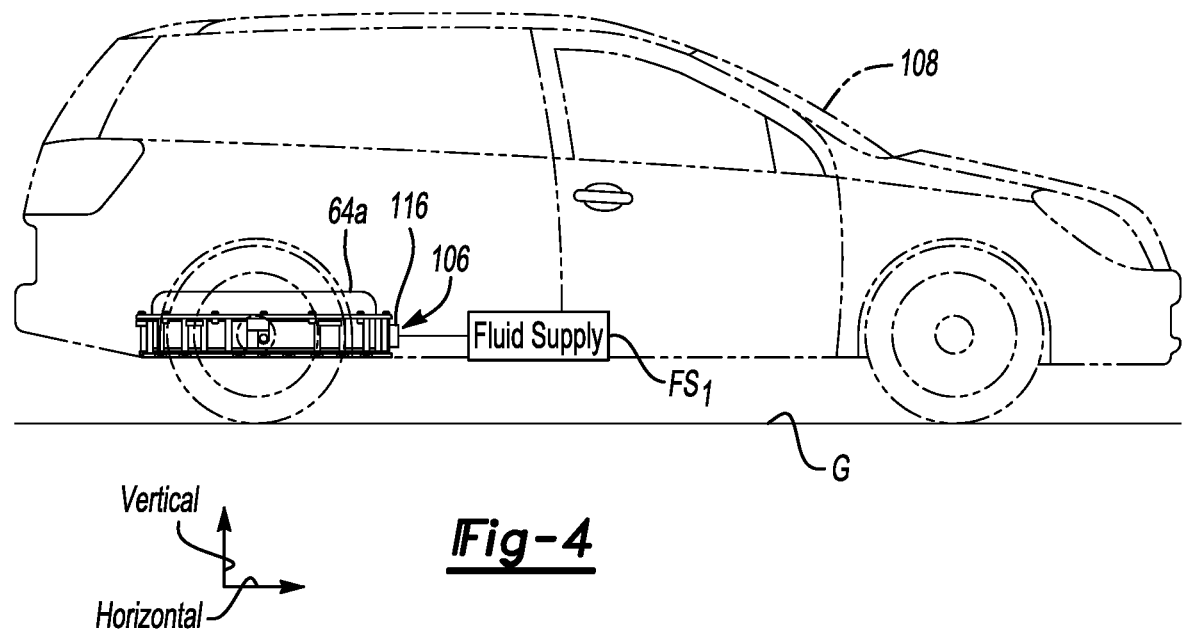
FIG. 4 illustrates a side view of the battery pack of FIG. 3 in an installed position with a vehicle.
Figure 5:
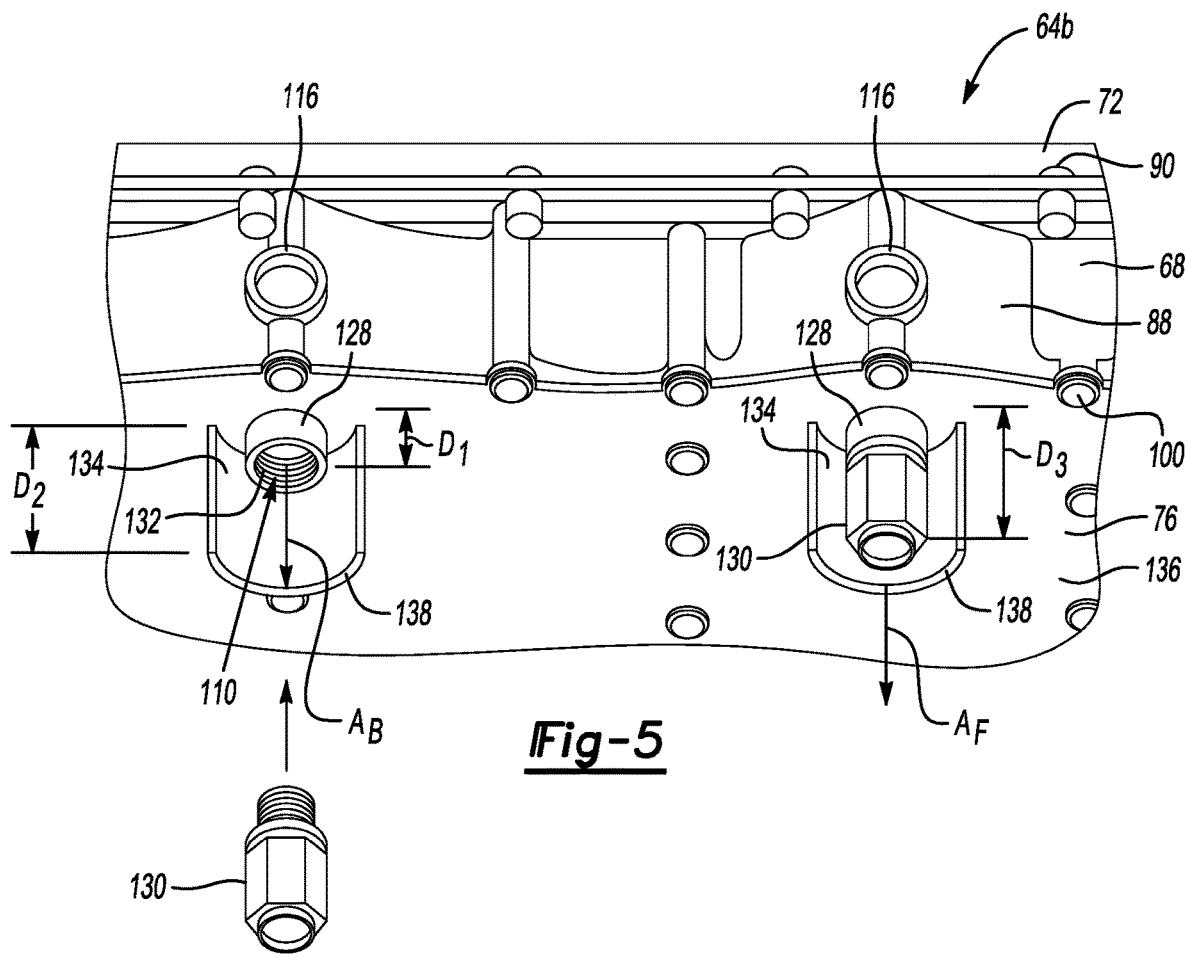
FIG. 5 illustrates a close up view and underneath view of a portion of the battery pack of FIG. 2 when utilizing ports in a downwardly facing side.
Figure 6:
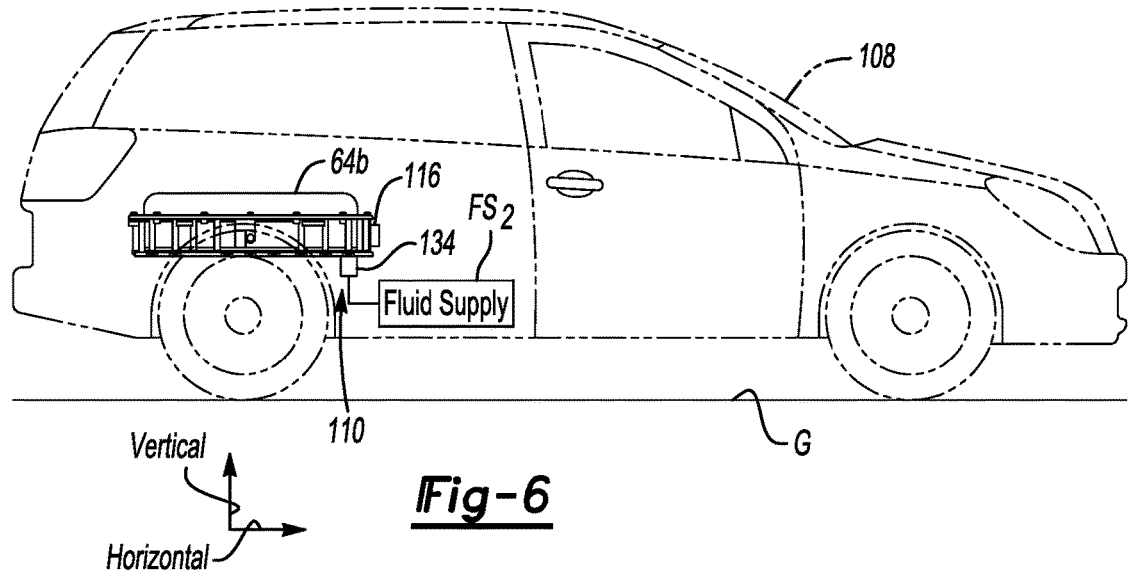
FIG. 6 illustrates a side view of the battery pack of FIG. 5 in an installed position with a vehicle.

For example, with reference to FIGS. 3 and 4, a vehicle 108a can include an enclosure 64a having ports 106 within the wall 88 of the tray 68 to circulate fluid between the flow path 92 and a fluid supply $FS_1$. With reference to FIGS. 5 and 6, another vehicle 108b can include an enclosure 64b having ports 110 within a surface of the cover 76 that faces vertically downward to circulate fluid between the flow path 92 and a fluid supply $FS_2$. The enclosures 64a and 64b include trays 68 and covers 76 cast from common tooling. Vertical and horizontal, for purposes of this disclosure, refer to the generally orientation of the enclosures 64a and 64b when in an installed position within the vehicles 108a and 108b during ordinary operation of the vehicle 108 and with reference to ground G.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

Referring again to the exemplary embodiment of FIGS. 3 and 4, the tray 68 is formed with a plurality of tray bosses 116, which provide the ports 106. In particular, the ports 106 are provided by apertures 124 established within the tray bosses 116. A drilling operation can, for example, be used to machine the aperture 124 within the respective one of the tray bosses 116. Threads could also be cut into the tray bosses 116 and used to threadably engage a coupling member.

The tray bosses 116, in this exemplary non-limiting embodiment, are areas of the tray 68 that protrude laterally outward from a surrounding surface 120 of the tray 68. The tray bosses 116 provide a locally strengthened area of the tray 68 for securing, for example, a coupling to the tray 68. The coupling can connect a conduit to the tray 68. The conduit can be used to convey fluid to or from the tray bosses 116 of the tray 68 for circulation along the flow path 92. In this example, the tray bosses 116, after machining the respective apertures 124, have an annular, collar-shaped form.

The tray bosses 116 are, notably, formed together with remaining portions of the tray 68 as a continuous monolithic structure. Thus, after forming the tray 68, creating the port 106 within the tray boss 116 requires relatively straightforward machining operations to remove material. The machining operation could be a drilling operation that includes drilling laterally inward and then downward to the flow path 92, for example. If the tray bosses 116 are not intended to provide the ports 106, the material can remain within the tray boss 116. Thus, the same tooling can be used to produce the tray 68 for use in enclosure assemblies where packaging environments necessitate the ports 106 in a laterally facing side, and for use in other packaging environments that do not require ports in a laterally facing side.

With reference to the exemplary embodiment of FIGS. 5 and 6, the cover 76 is formed with cover bosses 128, which provide the ports 110. In particular, the ports 110 are provided by apertures 132 in the cover bosses 128. A drilling operation can, for example, be used to machine the aperture 132 within the respective one of the cover bosses 128. Threads could also be cut into the cover bosses 128 and used to threadably engage respective couplings 130. In FIG. 5, one of the cover bosses 128 is engaging one of the couplings 130, and another of the couplings 130 is shown in a disengaged position.

The cover bosses 128, in this exemplary non-limiting embodiment, are areas of the cover 76 that protrude vertically downward from a surrounding surface 136 of the cover 76. The cover bosses 128 provide a locally strengthened area of the cover 76 for securing the couplings 130 to the cover 76. The couplings 130 can connect a conduit to the cover 76. The conduits and couplings 130 can be used to convey fluid to or from the cover bosses 128 of the cover 76 for circulation along the flow path 92. In this example, the cover bosses 128, after machining the respective apertures 132, have an annular, collar-shaped form.

The cover bosses 128 are, notably, formed together with remaining portions of the cover 76 as a continuous monolithic structure. Thus, after forming the cover 76, creating the port 110 within the cover boss 128 requires relatively straightforward machining operations to remove material. The machining operation could be a drilling operation for example. If the cover bosses 128 are not intended to provide the ports 110, the material can remain within the cover boss 128. Thus, the same tooling can be used to produce the cover 76 for use in enclosure assemblies where packaging requirements necessitate the ports 110 in a downwardly facing side, and for use in other environments that do not require ports in a downwardly facing side.

The cover 76 is formed to include a protective fin 134 about each of the cover bosses 128. The protective fin 134 is part of a continuous monolithic structure with the remaining portions of the cover 76. The protective fins 134 can protect the couplings 130, the cover bosses 128, and other areas from damage when the cover bosses 128 are engaged with one of the couplings 130.

The cover bosses 128, in this exemplary embodiment, each extend a first distance $D_1$ from the surrounding surface 136 of the cover 76. The protective fins 134 each extend a second distance $D_2$ from the surrounding surface 136. The second distance $D_2$ is greater than the first distance $D_1$, which facilitates protection of the cover bosses 128 with the protective fins 134. If, for example, an object moves relatively upward toward the cover 76, the object contacts a terminal end 138 of the protective fin 134 rather than contacting the cover boss 128.

When the coupling 130 is engaged with the cover boss 128, the coupling 130 extends downward from the surrounding surface 136 a third distance $D_3$. The second distance $D_2$ is greater than the third distance $D_3$. Thus, the protective fins 134 can protect both the cover boss 128.

The cover bosses 128 extends longitudinally from the surrounding surface 136 along a longitudinal axis $A_B$. The protective fins 134 extend longitudinally from the surrounding surface 136 along a longitudinal axis $A_F$. With respect to the axes $A_B$ and $A_F$, the protective fins 134 are radially spaced a distance from both the associated cover bosses 128 and the coupling 130 engaged to that cover boss 128. Spacing the protective fin 134 from the associated cover boss 128 can facilitate, among other things, tooling clearances when manufacturing the cover 76 to include the protective fins 134.

Relative to the axes $A_B$ and $A_F$, the protective fin 134 extends circumferentially about only portion of a perimeter of the cover boss 128, rather than an entire perimeter of the cover boss 128. In particular, in this example, the protective fins 134 each extend 180 degrees about the perimeter of the associated cover boss 128. Extending the protective fin 134 about only a portion of the perimeter of the associated cover boss 128 can provide ample access for connecting the coupling 130 to the associated cover boss 128.

Referring again to FIGS. 3 and 4 with continuing reference to FIGS. 5 and 6, when the ports 106 within the laterally facing side of the enclosure 64a are used, some or all of the protective fins 134 can be machined away from the cover 76, if required, to provide necessary ground clearance or to meet other packaging requirements, for example. Portions of the cover bosses 128 could also be machined away.

Although shown in connection with the cover bosses 128, the protective fin 134 could instead or additionally be used in connection with the tray bosses 116. When used in connection with the tray bosses 116, the protective fin 134 is formed together with the remaining portions of the tray 68 as a continuous monolithic structure.

In the exemplary embodiment of FIGS. 3 and 4, one of the two depicted tray bosses 116 provides an inlet port to the flow path 92, and the other of the tray bosses 116 provides an outlet port from the flow path 92. In the exemplary embodiment of FIGS. 5 and 6, one of the two depicted cover bosses 128 provides an inlet port to the flow path 92, and the other of the cover bosses 128 provides an outlet port from the flow path 92. In other examples, one of the tray bosses 116 could provide an inlet, and one of the cover bosses 128 could provide an outlet, or vice versa.

Features of the disclosed examples include a tray and a cover of a battery enclosure that can be utilized to provide a plurality of different coolant port locations. This facilitates common part usage across vehicles requiring different coolant port configuration. The commonality can help with reduced costs and simplifying assembly processes.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
   a tray;
   a cover adjacent the tray to provide a flow path therebetween;
   a tray boss configured to selectively provide a port through the tray to the flow path;
   a cover boss configured to selectively provide a port through the cover to the flow path; and
   a protective fin that is spaced from, and extends at least partially about, the tray boss or the cover boss, wherein the protective fin extends about a partial circumferential perimeter of the tray boss or the cover boss, and the protective fin is radially spaced a distance from all portions of the tray boss or the cover boss relative to a longitudinal axis of the protective fin.

2. The battery assembly of claim 1, wherein the tray boss is a continuous monolithic portion of the tray and the cover boss is continuous monolithic portion of the cover.

3. The battery assembly of claim 1, wherein the protective fin extends at least partially about the cover boss, and the protective fin is a continuous monolithic portion of the cover.

4. The battery assembly of claim 3, further comprising an aperture within the cover boss to provide the port through the cover.

5. The battery assembly of claim 4, wherein the cover boss is a first cover boss and the port through the cover provided by the aperture in first cover boss is an inlet to the flow path, and further comprising a second cover boss with an aperture that provides an outlet from the flow path.

6. The battery assembly of claim 3, wherein the cover boss extends longitudinally a first distance from a surrounding outer surface of the cover, and the protective fin extends longitudinally a second distance from the surrounding outer surface of the cover, the second distance greater than the first distance.

7. The battery assembly of claim 6, further comprising a coupling connected directly to the cover boss, the coupling fluidly couples a coolant conduit to the port through the cover provided by the cover boss, the coupling, when directly connected to the cover boss, extending a third distance from the surrounding outer surface of the cover, the second distance greater than the third distance.

8. The battery assembly of claim 7, wherein the coupling threadably engages the cover boss.

9. The battery assembly of claim 3, wherein the protective fin and the cover boss project vertically downward from the surrounding outer surface of the cover.

10. The battery assembly of claim 3, wherein the tray boss projects laterally from a surrounding outer surface of the tray.

11. The battery assembly of claim 1, further comprising an aperture within the tray boss to provide the port through the tray, the protective fin extending at least partially about the cover boss and configured to be removed from the remaining portions of the cover.

12. The battery assembly of claim 1, further comprising a coupling engaged with the tray boss, wherein the protective fin extends about a partial circumferential perimeter of the cover boss and some of all of the protective fin is machined to provide ground clearance.

13. The battery assembly of claim 12, wherein the partial circumferential perimeter is 180 degrees.

14. The battery assembly of claim 12 wherein the coupling is threadable engaged with the tray boss.

15. A battery assembly, comprising:
    a tray;
    a cover adjacent the tray to provide a flow path therebetween;
    a tray boss configured to selectively provide a port through the tray to the flow path;
    a cover boss configured to selectively provide a port through the cover to the flow path; and
    a protective fin that is spaced from, and extends at least partially about, the cover boss, the protective fin extends about a partial circumferential perimeter the cover boss, and the protective fin is radially spaced a distance from all portions of the cover boss relative to a longitudinal axis of the protective fin.

16. The battery assembly of claim 15, further including a coupling threadably engaged with the cover boss, the coupling connecting a conduit to the cover.

17. The battery assembly of claim 16, wherein the protective fin extends vertically downward past the coupling.

18. The battery assembly of claim 17, wherein the protective fin extends 180 degrees about the perimeter.

19. The battery assembly of claim 15, further comprising a coupling threadably engaged with the tray boss, wherein some of all of the protective fin is machined to increase ground clearance.

* * * * *